Sept. 13, 1960   R. J. THORPE   2,952,471
WHEELED TROLLEYS

Filed Nov. 25, 1957   4 Sheets-Sheet 1

INVENTOR
BY Ronald James Thorpe
Albert B. Jackes
ATTORNEY

Sept. 13, 1960 R. J. THORPE 2,952,471
WHEELED TROLLEYS

Filed Nov. 25, 1957 4 Sheets-Sheet 2

INVENTOR
BY Rowell James Thorpe
ATTORNEY

Sept. 13, 1960 R. J. THORPE 2,952,471
WHEELED TROLLEYS
Filed Nov. 25, 1957 4 Sheets-Sheet 3

INVENTOR
BY *Russell James Thorpe*
*Albert J. Jacks*
ATTORNEY

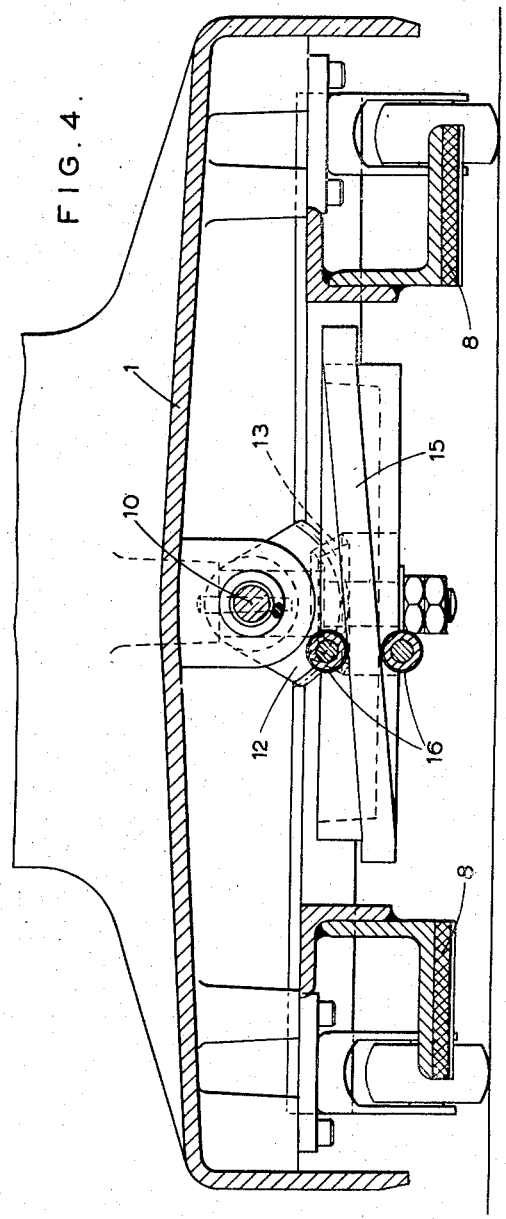

United States Patent Office 2,952,471
Patented Sept. 13, 1960

2,952,471

WHEELED TROLLEYS

Ronald James Thorpe, New Addington, England, assignor to Allen & Hanburys Limited, London, England, a British company Filed Nov. 25, 1957, Ser. No. 698,831

Claims priority, application Great Britain Nov. 26, 1956

3 Claims. (Cl. 280—43.13)

This invention relates to wheeled trolleys.

The invention has particular reference to a trolley which can be used as the wheeled base of a surgical operation table and the invention will hereinafter be described in its application to such a table. It will, however, be appreciated that the invention has other applications, for example to wheeled bases for surgical and dental operation chairs as well as to trolleys for industrial purposes.

Surgical operation tables must be movable in any direction and must be capable of accurate positioning, for example in relation to a source of light, in accordance with the requirements of a surgeon, and tables mounted on castor wheels are particularly suitable for this purpose. However, it is now common practice in surgical operations to anaesthetise a patient on an operation table in one room and then take him, still on the table, to an operation theatre and castor-mounted wheels make it difficult to move a table over the relatively long distance between a room in which pre-operation treatment is carried out and an operation theatre since castor-mounted tables have a tendency to move sideways.

It is an object of the present invention to provide a wheeled base for an operation table which enables the table to be easily moved over relatively large distances in the forward and backward direction and also to be moved in any direction. Accordingly, the invention provides a trolley having a first set of castor-mounted wheels at one end and a set of fixedly mounted wheels at the other end, a second set of castor-mounted wheels near the fixedly mounted wheels and means for disengaging the fixedly mounted wheels or the second set of castor-mounted wheels from the ground as desired. Thus, the trolley can be moved on fixedly mounted wheels at one end and castor-mounted wheels at the other end or can be moved entirely on castor-mounted wheels as desired.

A preferred embodiment of the invention is illustrated in the accompanying drawings of which:

Figure 4 is a transverse sectional view through the trolley.

Figure 2:
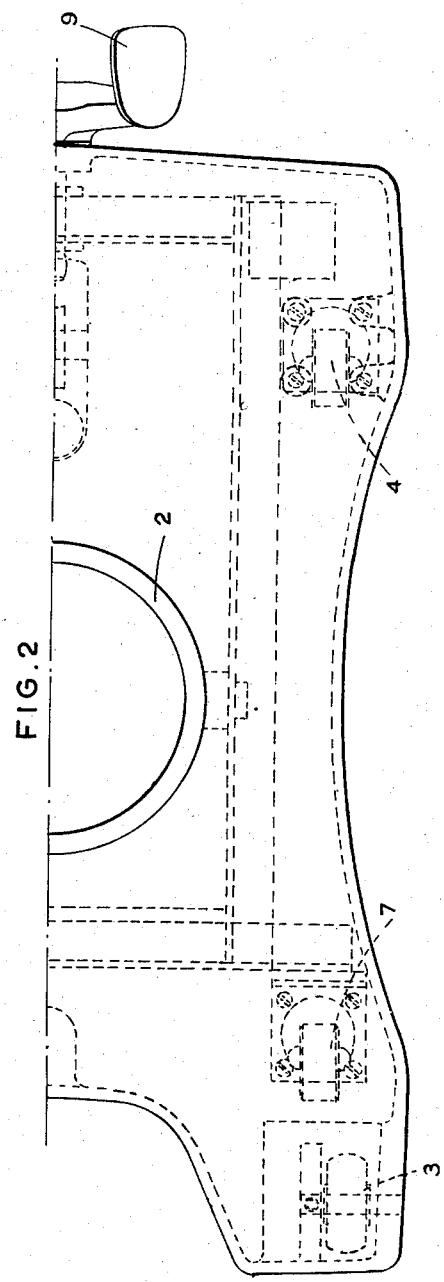
Figure 2 is a fragmentary plan view of the same trolley.
Figure 3:
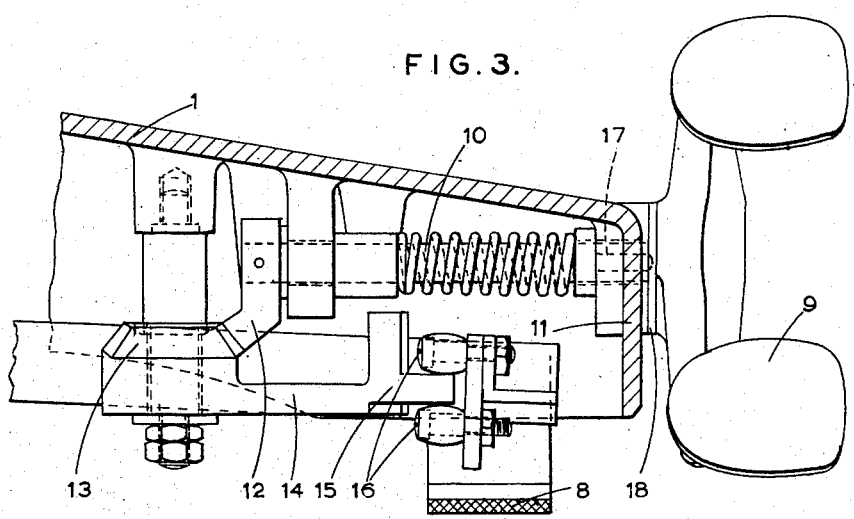
Figure 3 is a fragmentary sectional view to an enlarged scale, of an engaging mechanism of the trolley.

As shown in the drawings a wheeled base for a surgical operation table is a metal casting 1 of relatively rectangular shape and provided with a central housing 2 for the lifting and lowering mechanism of the platform or table top of the table (not shown). The base is supported on wheels arranged in pairs at opposite ends of the base. The wheels 3 at one end of the base, hereinafter considered to be the forward end for convenience of description, have fixed mountings and the wheels 4 (Figure 2) at the other (rear) end have castor mountings, only one of the wheels 4 being visible in the drawings.

A rockable frame 5 is mounted on a central pivot 6 beneath the base casting 1 so that it can be rocked about an axis extending transversely of the base. A pair of wheels 7 is fixed to the forward end of the frame 5 by means of castor mountings and a pair of brake shoes 8 is arranged at the rear end of the frame 5.

Figure 1:
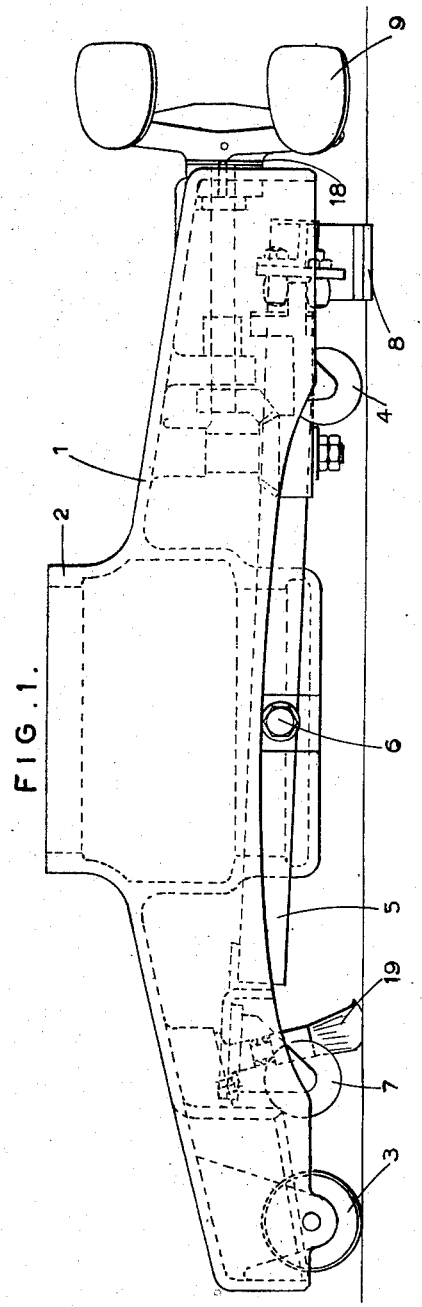
Figure 1 is an elevation of a wheeled trolley.

A pedal 9 is arranged outside the rear end of the base and is mounted on a pedal shaft 10 supported in bearings 11 inside the base casting 1. The end of the pedal shaft 10 supports a toothed gear 12 meshing with a bevel pinion 13 on a quadrant member 14 having a cam track 15 on its curved edge. Cam follower rollers 16 supported by the frame 5 engage on opposite sides of the cam track 15 so that rotation of the quadrant member 14 consequent on rotation of the pedal 9 will cause the cam follower rollers 16 to rise and fall thereby to rock the frame 5. The pedal 9 can be rotated into any one of three positions to place the frame 5 in any one of the three positions, namely:

(a) A position in which the castor wheels 7 at the forward end of the frame 5 are on the ground and the fixedly mounted wheels 3 at the forward end of the base and the brake shoes 8 at the rear end of the frame are lifted clear of the ground, (b) A position (shown in Figure 1) in which the brake shoes 8 at the rear of the frame are on the ground and the castor wheels 7 at the forward end of the frame are clear of the ground, and (c) A position in which the castor wheels 7 and the brake shoes 8 of the frame are both clear of the ground.

For positively locating the pedal 9 in each of its positions so as to prevent the pedal being accidentally moved past a desired position, an index pin 17 is arranged adjacent the pedal shaft 10 and is spring-loaded into engagement with apertures in an index plate 18 rotatable with the pedal 9.

An earthing brush 19 in contact with the ground can also be provided.

What I claim is:

1. A wheeled trolley comprising a base member, a first pair of castor-mounted wheels at one end of said base member, a pair of wheels fixedly supported at the other end of said base member, a rockable frame mounted in said base member for rotation about an axis extending transversely thereof, a second pair of castor-mounted wheels mounted on said frame in a position in which it is adjacent said fixedly supported wheels, a ground-engaging brake mounted on said frame in a position in which it is adjacent said first pair of castor-mounted wheels, a pedal outside said base member, and a connection between said pedal and said frame whereby rotation of said pedal will rock said frame thereby to engage or disengage as desired said second pair of castor-mounted wheels or said brake with the ground, thereby respectively to disengage or engage said first pair of castor-mounted wheels and said fixedly supported wheels and the ground.

2. A wheeled trolley comprising a base member, a first pair of castor-mounted wheels at one end of said base member, a pair of wheels fixedly supported at the other end of said base member, a rockable frame mounted in said base member for rotation about an axis extending transversely thereof, a second pair of castor-mounted wheels mounted on said frame in a position in which it is adjacent said fixedly supported wheels, a ground-engaging brake mounted on said frame in a position in which it is adjacent said first pair of castor-mounted wheels, a rotatable shaft extending from inside said base member to the outside thereof, a pedal mounted on said shaft outside said base member, a movable cam-surfaced member, gearing connecting said shaft with said member, and a cam follower connected with said frame so that rotation of said pedal will cause said frame to rock about its axis thereby to engage or disengage as desired said second pair of castor-mounted wheels or said brake with the ground, thereby respectively to disengage or engage said first pair of castor-mounted wheels and said fixedly supported wheels and the ground.

3. A surgical operation table mounted on a wheeled trolley comprising a base member, a first pair of castor-mounted wheels at one end of said base member, a pair of wheels fixedly supported at the other end of said base member, a rockable frame mounted in said base member for rotation about an axis extending transversely thereof, a second pair of castor-mounted wheels mounted on said frame in a position in which it is adjacent said fixedly supported wheels, a ground-engaging brake mounted on said frame in a position in which it is adjacent said first pair of castor-mounted wheels, a rotatable shaft extending from inside said base member to the outside thereof, a pedal mounted on said shaft outside said base member, a movable cam-surfaced member, gearing connecting said shaft with said member, and a cam follower connected with said frame so that rotation of said pedal will cause said frame to rock about its axis thereby to engage or disengage as desired said second pair of castor-mounted wheels or said brake with the ground, thereby respectively to disengage or engage said first pair of castor-mounted wheels and said fixedly supported wheels and the ground.

References Cited in the file of this patent

UNITED STATES PATENTS

| 1,082,160 | Kurowski | Dec. 23, 1913 |
| 2,599,717 | Menzies | June 10, 1952 |

FOREIGN PATENTS

| 345,475 | Great Britain | Mar. 26, 1931 |